US007012560B2

(12) United States Patent
Braeuchle et al.

(10) Patent No.: US 7,012,560 B2
(45) Date of Patent: Mar. 14, 2006

(54) OBJECT SENSING APPARATUS

(75) Inventors: Goetz Braeuchle, Reichartshausen (DE); Martin Heinebrodt, Stuttgart (DE); Jürgen Böcker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 10/491,466

(22) PCT Filed: Sep. 17, 2002

(86) PCT No.: PCT/DE02/03483

§ 371 (c)(1),
(2), (4) Date: Oct. 28, 2004

(87) PCT Pub. No.: WO03/031228

PCT Pub. Date: Apr. 17, 2003

(65) Prior Publication Data

US 2005/0062615 A1   Mar. 24, 2005

(30) Foreign Application Priority Data

Oct. 5, 2001 (DE) ................................. 101 49 115

(51) Int. Cl.
*G01S 13/93* (2006.01)
(52) U.S. Cl. .............................. 342/70; 342/71; 342/72; 342/52; 342/54; 342/55; 342/114; 342/115; 342/174; 340/435; 340/436; 340/903
(58) Field of Classification Search ............ 342/70–72, 342/52–55, 27, 114, 115, 173, 174, 189, 195; 340/435, 436, 903; 701/301
See application file for complete search history.

(56) References Cited

U.S. PATENT DOCUMENTS

| 5,471,214 A | * | 11/1995 | Faibish et al. ................. 342/70 |
| 5,479,173 A | * | 12/1995 | Yoshioka et al. ............. 342/70 |
| 5,585,798 A | * | 12/1996 | Yoshioka et al. ............. 342/70 |
| 6,031,484 A | * | 2/2000 | Bullinger et al. ............. 342/72 |
| 6,055,042 A | * | 4/2000 | Sarangapani ................ 356/4.01 |
| 6,061,015 A | * | 5/2000 | Sugimoto ..................... 342/71 |
| 6,067,110 A | * | 5/2000 | Nonaka et al. ............. 348/148 |
| 6,085,151 A | * | 7/2000 | Farmer et al. ............... 701/301 |

(Continued)

FOREIGN PATENT DOCUMENTS

DE   198 56 313   6/2000

(Continued)

OTHER PUBLICATIONS

"Multi-resolution vehicle detection using artificial vision", Broggi, A.; Cerri, P.; Antonello, P.C.;Intelligent Vehicles Symposium, 2004 IEEE, Jun. 14-17, 2004 pp.: 310-314.*

(Continued)

Primary Examiner—John B. Sotomayor
(74) Attorney, Agent, or Firm—Kenyon & Kenyon

(57) ABSTRACT

An object sensing apparatus for driver assistance systems in motor vehicles, including at least two sensor systems which measure data concerning the location and/or motion status of objects in the vicinity of the vehicle, and whose detection regions overlap one another, characterized by an error recognition device that checks the data measured by the sensor systems for absence of contradictions, and outputs an error signal upon detection of a contradiction.

10 Claims, 3 Drawing Sheets

U.S. PATENT DOCUMENTS

| | | | |
|---|---|---|---|
| 6,580,385 B1 | 6/2003 | Winner et al. | 342/70 |
| 6,727,844 B1 * | 4/2004 | Zimmermann et al. | 342/70 |
| 6,762,711 B1 * | 7/2004 | Doerfler | 342/70 |
| 6,771,208 B1 * | 8/2004 | Lutter et al. | 342/52 |
| 6,873,251 B1 * | 3/2005 | Schiffmann et al. | 340/436 |
| 6,882,287 B1 * | 4/2005 | Schofield | 340/903 |
| 2003/0201929 A1 * | 10/2003 | Lutter et al. | 342/52 |
| 2004/0012516 A1 * | 1/2004 | Schiffmann et al. | 342/70 |

FOREIGN PATENT DOCUMENTS

| | | |
|---|---|---|
| DE | 199 34 670 | 12/2000 |
| EP | 0 544 468 | 6/1993 |

OTHER PUBLICATIONS

"A vehicle recognition method robust against vehicles' overlapping based on stereo vision", Kimachi, M.; Wu, Y.; Ogata, S.;Intelligent Transportation Systems. Proceedings. 1999 IEEE/IEEJ/JSAI International Conf. on, Oct. 5-8, 1999 Ps:865-869.*

"Unsupervised Learning of Discriminative Edge Measures for Vehicle Matching between Non-Overlapping Cameras", Ying Shan; Sawhney, H.S.; Kumar, R.T.CVPR 2005. IEEE vol. 1, Jun. 20-26, 2005 Page(s): 894-901.*

* cited by examiner

OBJECT SENSING APPARATUS

FIELD OF THE INVENTION

The present invention relates to an object sensing apparatus for driver assistance systems in motor vehicles, including at least two sensor systems which measure data concerning the location and/or motion status of objects in the vicinity of the vehicle, and whose detection regions overlap one another.

BACKGROUND INFORMATION

Motor vehicles are increasingly being equipped with driver assistance systems that assist and provide support to the driver in driving the vehicle. One example of such an assistance system is a so-called adaptive cruise control (ACC) system, which automatically regulates the vehicle's speed to a desired speed selected by the driver or, if a preceding vehicle is present, adapts the speed in such a manner that a suitable distance from the preceding vehicle, monitored with the aid of a distance sensor, is maintained. Other examples of driver assistance systems are collision warning devices; automatic lane keeping systems (LKS), which detect roadway markings and automatically keep the vehicle in the center of the lane by intervening in the steering system; sensor-assisted parking aids, and the like. All these assistance systems require a sensor system with which information concerning the vehicle's vicinity may be sensed, as well as evaluation units with which that information may be suitably evaluated and interpreted.

These devices are capable of detecting objects in the vehicle's vicinity, for example other vehicles and additional obstacles, and sensing data that characterize the location and, if applicable, the motion status of those objects. The sensor systems and associated evaluation units will therefore be referred to in combination as an object sensing apparatus.

Examples of sensor systems that are used in such object sensing apparatuses are radar systems and their optical counterparts (so-called lidar systems), as well as stereo camera systems. With radar systems, the distance of the object along the line of sight may be measured by evaluating the transit time of the radar echo. The relative velocity of the object along the line of sight may also be measured directly by evaluating the Doppler shift of the radar echo. With a direction-sensitive radar system, for example a multi-beam radar, it is also possible to sense directional data concerning objects, for example the azimuth angle relative to a reference axis defined by the alignment of the radar sensor. With stereo camera systems, directional data and also (by parallax evaluation) distance data may be obtained. By evaluating the raw data measured directly by these sensor systems, it is possible to calculate data that indicate the distance of the object in the direction of travel, as well as the transverse offset of the object relative to the center of the roadway or relative to the instantaneous straight-ahead orientation of the vehicle.

Since conventional sensor systems have their strengths and weaknesses as regards sensing of the requisite measured data, it is advisable to use several sensor systems that supplement one another.

In ACC systems, it is conventional to subject the measured raw data to a plausibility evaluation in order to decide, or at least to indicate probabilities, as to whether the object sensed is a relevant obstacle or an irrelevant object, for example a sign at the side of the road. In some circumstances, an implausibility in the sensed data may also indicate a defect in the sensor system.

It general, however, it is not possible with conventional object sensing apparatuses reliably to detect misalignments or other defects in the sensor systems that negatively affect the functionality of the assistance system.

SUMMARY

According to an example embodiment of the present invention, an object sensing apparatus is provided with which it may be possible to detect defects in the sensor systems during operation more accurately and more reliably, and thus to improve the functional dependability of an assistance system.

According to an example embodiment of the present invention, an error recognition device checks the data measured by the sensor systems for absence of contradictions, and outputs an error signal upon detection of a contradiction.

As aspect of an example embodiment of the present invention is based on the consideration that when several sensor systems including mutually overlapping detection regions are present, it may often be the case that objects are located in the overlap region. In this situation, the sensor systems operating independently of one another furnish redundant information that makes possible error detection while the apparatus is in operation. When the participating sensor systems are operating correctly, the data furnished by them may be compatible with one another within certain error limits. If that is not the case—i.e. if the data contradict one another—it may be deduced therefrom that at least one of the participating sensor systems is defective, and an error signal is outputted. In one case, this error signal may be used to inform the driver of the malfunction by an optical or acoustic indicator and, if applicable, to initiate automatic deactivation of the assistance system. According to an example embodiment of the present invention, an automatic error correction may be performed using this error signal.

An example embodiment of the present invention thus may make possible a continuous self-diagnosis of the object sensing apparatus during normal vehicle operation, and thus a substantial improvement in the driving safety of the assistance system that uses the data of the object sensing apparatus.

In an example embodiment, the object sensing apparatus includes, in addition to a sensor system for the long-range region that is constituted e.g. by a 77-GHz radar system or a lidar system, a sensor system for the short-range region that has a shorter reach but also a larger angular region, so that dead angles in the short-range region may be largely eliminated. The sensor system for the short-range region may include a radar system or by a lidar system, or also by a video sensor system, for example a stereo camera system including two electronic cameras.

In an example embodiment, three mutually independent sensor systems whose detection regions include a shared overlap region may be present. There exists in this case, for objects that are located in the shared overlap region, a capability not only for error detection but also for easily identifying the faulty sensor system by "majority decision," and optionally for correcting the data, the alignment, or the calibration of the faulty system.

Automatic identification of the faulty system and automatic error correction are possible in specific circumstances even in example embodiments including only two sensor systems, e.g., by a plausibility evaluation in consideration of the details of the physical measurement principles used in the participating sensor systems. For example, a relatively accurate distance measurement is possible with radar and lidar systems, whereas distance measurement using a stereo camera system may involve greater error tolerances (especially at longer distances) and may depend critically on camera alignment. In the event of a discrepancy, therefore, a fault in the stereo camera system is highly probable. Conversely, a video system may permit a relatively accurate measurement of the transverse offset of a preceding vehicle, whereas transverse offset measurement by a radar or lidar system may depend critically on the alignment of the radar or lidar system. In this case, therefore, a discrepancy is more suggestive of a defect in the radar or lidar system.

In practice, the region in which the detection regions of the sensor systems overlap will be a region that is of relevance for the assistance system. In an ACC system, for example, the sensor systems for the short-range region and the long-range region may be configured so that they overlap in the distance region that corresponds to the typical safety distance from a preceding vehicle. In this case automatic error correction and an improvement in measurement accuracy may also be achieved by weighting the data furnished by the various sensor systems in accordance with their respective reliability, and then combining them to yield a final result.

According to an example embodiment of the present invention, it may be provided to store the error signals furnished by the error recognition device together with the associated mutually contradictory measurement data, and thus to create error statistics that facilitate diagnosis when the object sensing apparatus is repaired or maintained.

Example embodiments of the present invention will be explained in more detail below with reference to the appended Figures.

DETAILED DESCRIPTION

Figure 1:
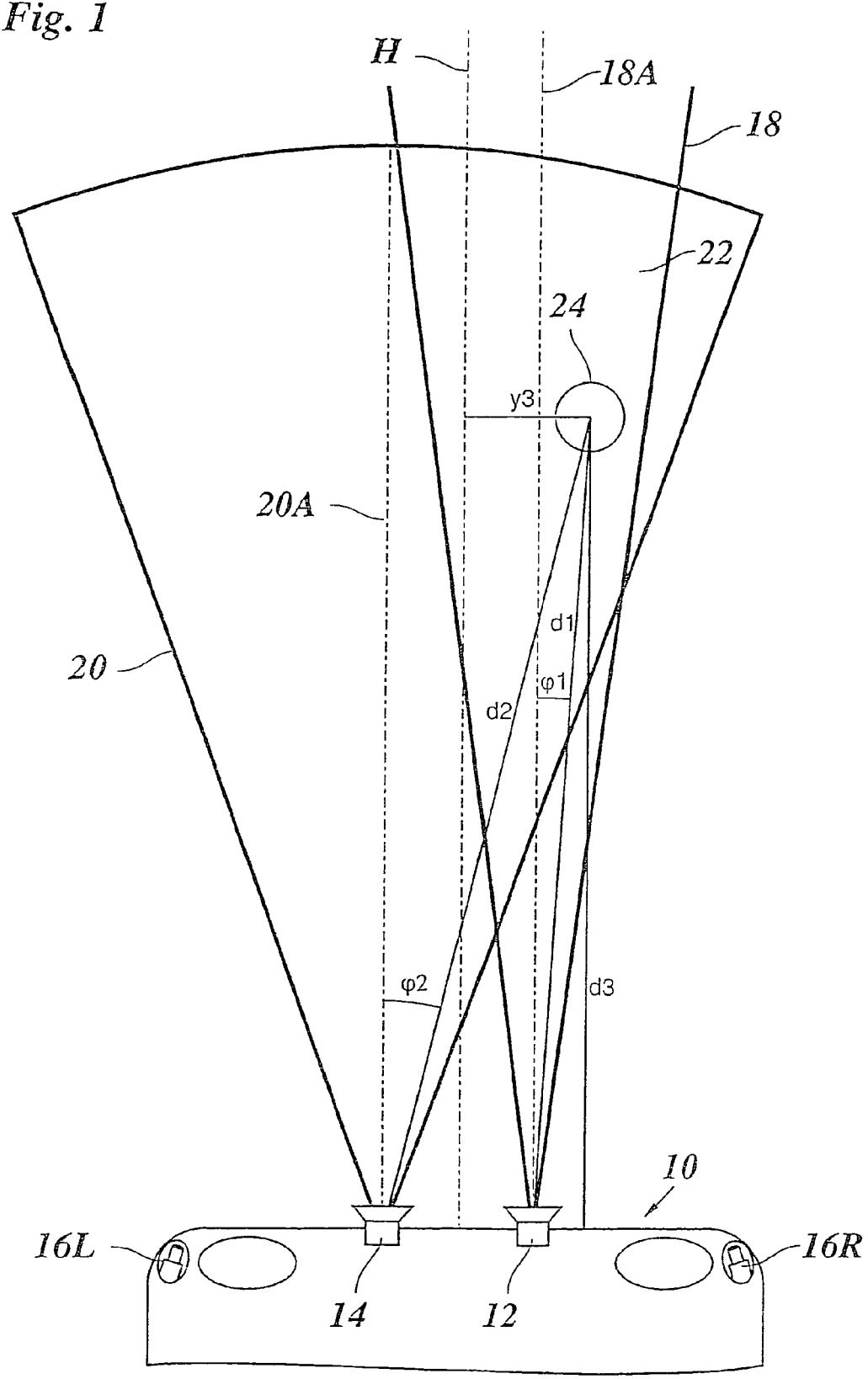
FIG. 1 schematically illustrates the detection regions of several sensor systems that are installed on a motor vehicle.

FIG. 1 illustrates, in a schematic plan view, the front part of a motor vehicle 10 that is equipped with three sensor systems operating independently of one another, namely a long-range radar 12, a short-range radar 14, and a video system that is constituted by two cameras 16L and 16R. Long-range radar 12 includes a detection region 18 having a range of, for example 150 m and a sensing angle of 15°, while short-range radar 14 includes a detection region 20 having a range of, for example, 50 m and a sensing angle of 40°. Between these detection regions 18, 20, which are not illustrated to scale in the drawings, there exists an overlap region 22. The detection region of the video system constituted by cameras 16L, 16R, however, which together will be labeled with the reference character 16, includes overlap region 22 (when visibility conditions are good). An object 24 that is located in this overlap region 22 may therefore be sensed by all three sensor systems.

Detection region 18 of long-range radar 12 is symmetrical with respect to a reference axis 18A that, when the radar sensor is correctly aligned, extends parallel to a main axis H which extends in the longitudinal direction through the center of vehicle 10. Detection region 20 of short-range radar 14 is accordingly symmetrical with respect to a reference axis 20A that is parallel to main axis H and to reference axis 18A.

Long-range radar 12 measures distance d1 to object 24 as well as the relative velocity of object 24 relative to vehicle 10, and azimuth angle j1 of object 24 relative to reference axis 18A. Close-range radar 14 correspondingly measures distance d2 to object 24, the relative velocity of object 24 along the line of sight from the radar sensor to the object, and azimuth angle j2 of object 24 relative to reference axis 20A.

The images of object 24 acquired by cameras 16L, 16R are evaluated electronically in video system 16. The evaluation software of such stereo camera systems is able to identify object 24 in the images acquired by the two cameras and to determine, based on the parallax shift, the location of object 24 in a two-dimensional coordinate system (parallel to the road surface). In this fashion, video system 16 furnishes perpendicular distance d3 of object 24 from vehicle 10 (i.e. from the baseline of cameras 16L, 16R), and transverse offset y3 of object 24 with respect to main axis H.

The local coordinates of object 24 may thus be determined in three mutually independent manners using the three sensor systems 12, 14, 16. The polar coordinates measured by the radar systems may be converted by a coordinate transformation into Cartesian coordinates, as constituted by the coordinate pair (d3, y3) in the example illustrated. The three coordinate sets measured independently of each other may then be compared to one another; if these coordinates contradict one another, this indicates that one of the three sensor systems is operating defectively. The faulty system may also be identified on the basis of the discrepant coordinate set.

The relative velocity of the object 24 may also be determined by differentiation over time of distance d3 measured with video system 16. Since the lines of sight from the radar sensors to object 24, along which the relative velocities are measured using the Doppler effect, are not exactly parallel to main axis H, the three measured relative velocities will differ slightly from one another. Under the distance conditions that occur in practice, however, this discrepancy may be negligible. If necessary, it may be corrected by conversion into Cartesian coordinates, so that the measured velocity data may also be compared with and adjusted to one another.

Figure 2:
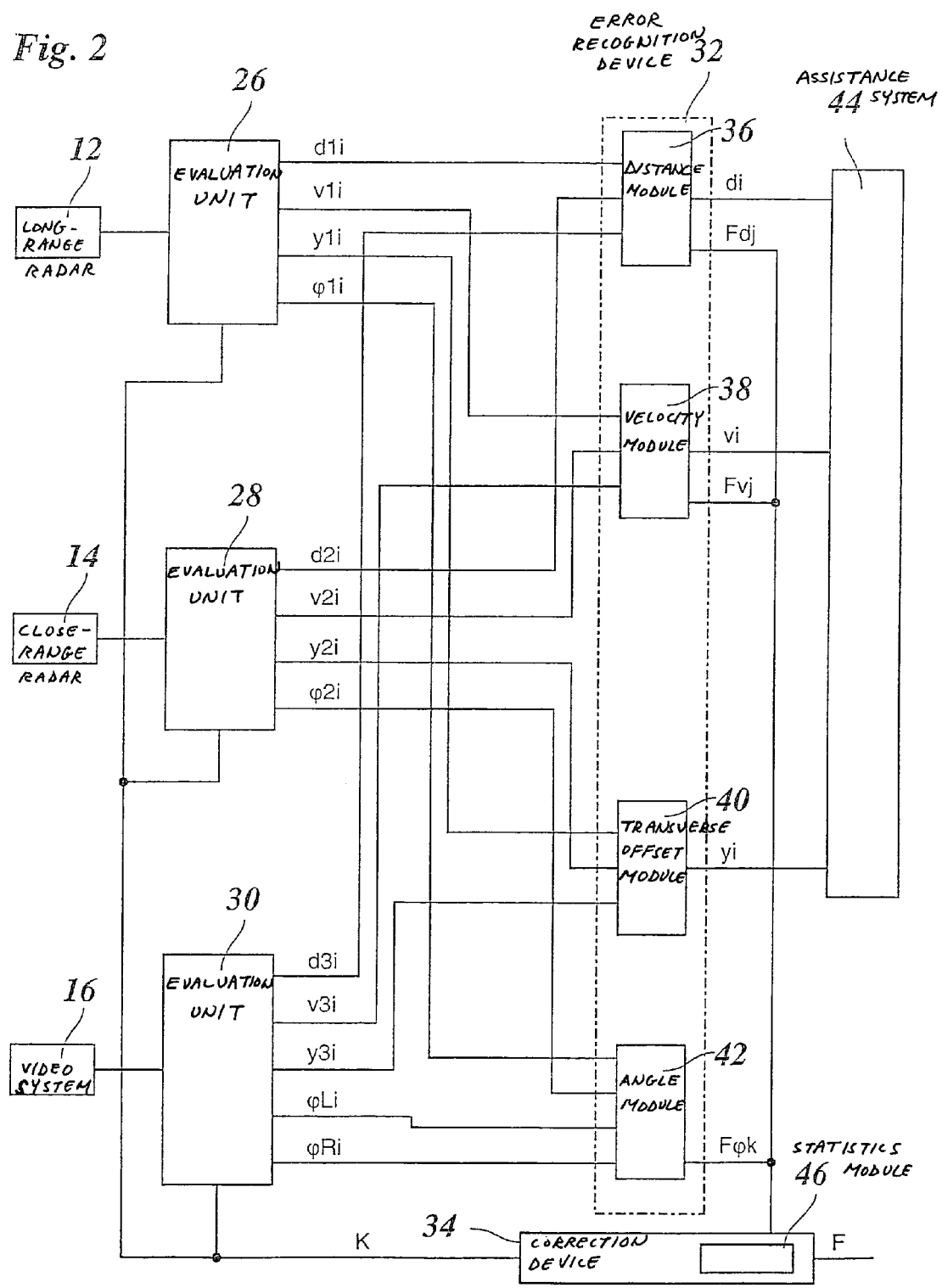
FIG. 2 is a block diagram of an object sensing apparatus according to an example embodiment of the present invention.

FIG. 2 is a block diagram of an object sensing apparatus that encompasses long-range radar 12, short-range radar 14, video system 16, and associated evaluation units 26, 28, 30, and furthermore an error recognition device 32 and a correction device 34. Evaluation devices 26, 28, 30, error recognition device 32, and correction device 34 may be constituted by electronic circuits, by microcomputers, or also by software modules in a single microcomputer.

From the raw data furnished by long-range radar 12, evaluation unit 26 determines distances $d1i$, relative velocities $v1i$, and azimuth angles $j1i$ of all objects that are present in sensing region 18 of long-range radar 12. Index i serves here to identify the individual objects. From the distance data and azimuth angles, evaluation unit 26 also calculates transverse offsets $y1i$ of the various objects.

In similar fashion, evaluation unit 28 determines distances $d2i$, relative velocity $v2i$, azimuth angles $j2i$, and transverse offsets $y2i$ of all objects that are present in sensing region 20 of short-range radar 14.

Evaluation unit 30 firstly determines azimuth angles jLi and jRi of the objects sensed by cameras 16L, 16R. These azimuth angles are defined analogously to azimuth angles j1 and j2 in FIG. 1, i.e. they indicate the angle between the respective line of sight to the object and a straight line parallel to main axis H. Distances d3$i$, transverse offsets y3$i$, and (by differentiation of the distance data over time) relative velocities v3$i$ are calculated on the basis of azimuth angles jL$i$ and jR$i$ and the known distance between cameras 16L and 16R.

Distances d1$i$, d2$i$, and d3$i$ determined by the three evaluation units 26, 28, 30 are conveyed to a distance module 36 of error recognition device 32. Correspondingly, relative velocity data v1$i$, v2$i$, and v3$i$ are conveyed to a velocity module 38, and transverse offset data y1$i$, y2$i$, and y3$i$ to a transverse offset module 40. An angle module 42 of error recognition device 32 evaluates azimuth angles j1$i$, j2$i$, jL$i$, and jR$i$.

The various modules of error recognition device 32 are connected to one another, and have access to all the data that are conveyed to error recognition device 32 from any of the evaluation units. The data connections illustrated in the drawings refer in each case only to the data processed on a foreground basis in the relevant module.

When evaluation unit 26 reports distance d$i$1 of a sensed object (having index i) to distance module 36, distance module 36 then first checks, on the basis of the associated transverse offset y1$i$, whether the object in question is also located in sensing region 20 of short-range radar 14 and/or in the sensing region of video system 16. If that is the case, the distance module checks whether data for that object are also available from evaluation units 28, 30. Identification of the objects is facilitated by the fact that distance module 36 may track the change over time in the distance data. For example, if an object is initially sensed only by long-range radar 12 and then enters sensing region 20 of short-range radar 14, it may be expected that evaluation unit 28 will report the occurrence of a new object that may then be identified with the tracked object. To eliminate ambiguities, it is also possible to employ the criterion that the local coordinates transmitted by the various evaluation units for the same object are at least approximately consistent with one another.

If distance data are available for a single object from several sensor systems, distance module 36 checks whether those distance data are consistent within the respective error limits. It is considered in this context that the error limits are themselves variable. For example, transverse offset data y1$i$ are relatively inaccurate for a large object distance, since long-range radar 12 has only a limited angular resolution and even slight deviations in the measured azimuth angle result in a considerable deviation in the associated transverse offset. If the distance data are consistent within the error limits, the consistent value d$i$ is transmitted to a downstream assistance system 44, for example an ACC system. The outputted value d$i$ may be a weighted average of distance data d1$i$, d2$i$, and d3$i$, the weights being greater in proportion to the reliability of the data of the sensor system in question.

Distance data d2$i$ and d3$i$ transmitted from evaluation units 28 and 30 are evaluated by distance module 36 in a manner corresponding to that for data d1i from evaluation unit 26. Thus, for example, if an object is initially sensed only by short-range radar 14 and then migrates into sensing region 18 of long-range radar 12, distance module 36 thus initially tracks the change in the data arriving from evaluation unit 28 and then checks whether corresponding data also arrive, at the expected point in time, from evaluation unit 26.

If the expected data from one of evaluation units 26, 28, 30 are absent, i.e. if a sensor system does not sense an object even though that object should, to judge by the data from the other systems, be located in the sensing region, distance module 36 then outputs an error signal Fdj. Index j here identifies the sensor system from which no data were obtained. Error signal Fdj thus indicates that the sensor system in question has possibly failed or is "blind."

If distance module 36 contains all the expected distance data but if those data deviate from one another by more than the error limits, error signal Fdj is once again outputted. In this case, error signal Fdj also indicates the sensor systems from which the discrepant data were obtained, and the magnitude of the discrepancy.

If distance data that are consistent within the error limits are available from at least two sensor systems, distance value d$i$ may be created from those data and outputted to assistance system 44 even though an error has been identified and error signal Fdj has been generated.

The manner of operation of velocity module 38 is analogous to the manner of operation (described above) of distance module 36, except that here it is not the distance data but rather velocity data v1$i$, v2$i$, and v3$i$ that are compared with one another, in order to create therefrom a velocity value v$i$ that is outputted to assistance system 44, and/or to output an error signal Fvj that indicates a discrepancy between the measured relative velocities.

The manner of operation of transverse offset module 40 is also largely analogous to the manner of operation of distance module 36 and velocity module 38 as described above. In the example illustrated, however, no provision is made for output of an error signal in this case, since the transverse offset data are merely derived data that are calculated from the measured azimuth angles, so that the azimuth angle should be primarily relied upon for error recognition.

Azimuth angles j1$i$, j2$i$, jL$i$, and jR$i$ are accordingly compared separately in angle module 42. In the comparison of these azimuth angles, consideration is given to the discrepancies that necessarily result, for a given object, from the object distance and the various positions of the relevant sensors or cameras on the baseline. If a discrepancy exceeding the error limits remains when these deviations have been considered, an error signal Ffk is outputted. Index k (k=1 through 4) in this case identifies camera 16L or 16R or the radar sensor whose azimuth angle or angles do not match the other azimuth angles. If a sufficiently reliable determination of the transverse offset is possible despite the discrepancy that has been identified, a corresponding value y$i$ for the transverse offset is outputted from transverse offset module 40 to assistance system 44.

In the example illustrated, error signals Fdj, Fvj, and Ffk are conveyed to correction device 34. If the error signals indicate with sufficient certainty which of the three sensor systems is responsible for the discrepancy, and if it is evident from the nature and magnitude of the identified error that the error may be corrected by a recalibration of the sensor system in question, a correction signal K is then outputted to the associated evaluation unit 26, 28, or 30. Optionally, the correction signal may also be outputted directly to long-range radar 12, short-range radar 14, or video system 16.

One example of a systematic error that may be corrected by recalibration is a misalignment of a radar sensor or a camera, which causes a deflection of the reference axis in question (e.g. 18A or 20A) and thus an incorrect measurement of the azimuth angle. In this case the calibration may be modified in the relevant evaluation unit in such a manner that the misalignment is corrected and the correct azimuth angle is once again obtained. Although the misalignment should still be remedied at the next service (since the misalignment also results in an undesirable change in the sensing region), system functionality may nevertheless be temporarily maintained by recalibrating.

In the example embodiment illustrated, correction device 34 includes a statistics module 46 which stores error signals Fdj, Fvj, and Fjk that have occurred during operation of the apparatus, and thus documents the nature and magnitude of all the errors that occur. These data are then available for diagnostic purposes when the apparatus is serviced or repaired. Statistics module 46 additionally has, in the example illustrated, the function of deciding whether an error may be automatically corrected or whether an irresolvable error is present and an optical or acoustic error message F is outputted to the driver in order to inform him or her of the malfunction. Error message F is outputted, for example, when the signals obtained from error correction device 28 indicate a total failure of one of the sensor systems. The functions of statistics module 46 offer the possibility of not immediately outputting error message F in the case of a discrepancy that occurs only once or sporadically, but outputting the error message only when discrepancies of the same kind occur with a certain frequency. The robustness of the apparatus may thereby be considerably improved.

Figure 3:
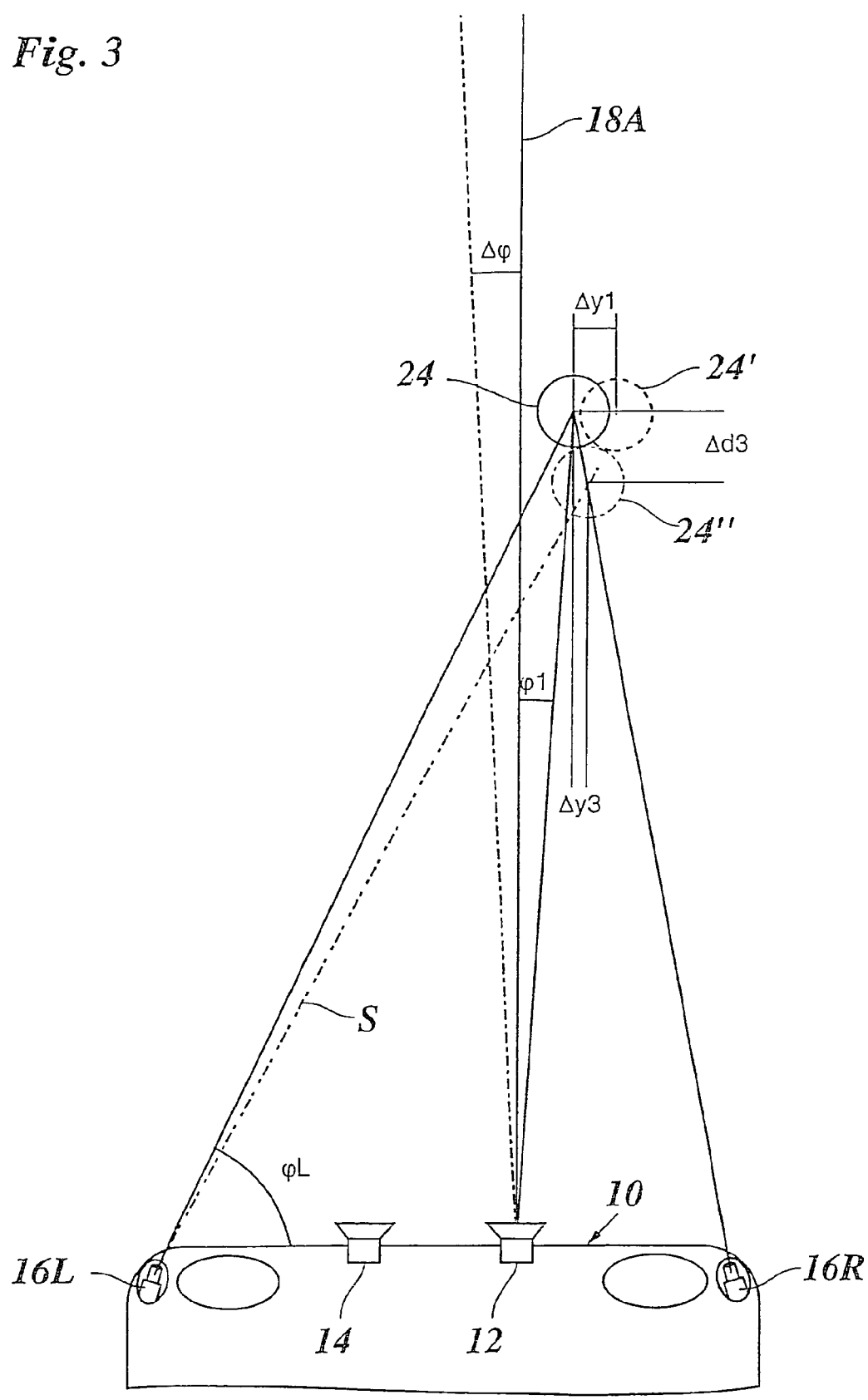
FIG. 3 illustrates the consequences of misalignments of various sensor systems.

FIG. 3 illustrates, using examples, the effect of a sensor misalignment on the measurement result.

If main axis 18A is deflected through angle Dj, for example as a result of a misalignment of long-range radar 12, the measured azimuth angle j1 is too great by an amount equal to that angle, and long-range radar 12 "sees" object 24 not in its actual position, but in position 24' drawn with dashed lines. This results in an error Dy1 in the measured transverse offset. The farther away object 24 is from vehicle 10, the greater this error.

If, on the other hand, left camera 16L of the video system has a misalignment of the same magnitude, the associated azimuth angle jL is then distorted by an amount equal to the same angular deviation Dj, as indicated in FIG. 3 by a line of sight S drawn as a dot-dash line. Video system 16 then sees object 24 at the intersection of the lines of sight of the two cameras, i.e. in position 24". It is evident that in this case the error Dy3 measured for the transverse offset is substantially smaller. On the other hand, however, the misalignment of camera 16L results in a considerable error Dd3 in the distance measurement.

These relationships may be utilized in the apparatus described for automatic error correction, even when only two sensor systems are present.

For example, if a misalignment of long-range radar 12 exists, a comparison of the transverse offset data from long-range radar 12 and from video system 16 yields a definite discrepancy Dy1, whereas the distance data measured with the same systems are substantially consistent. From this it may be concluded that the error is attributable to a misalignment of the radar system and not to a misalignment of a camera. It is even possible to determine the misalignment quantitatively on the basis of the measured magnitude of the error, and to correct it by recalibration of the radar sensor or the associated evaluation unit 26.

If, on the other hand, a misalignment of camera 16L exists, this is evident from a large discrepancy Dd3 in the distance data while the transverse offset data are largely consistent. In this case the error may be corrected by recalibrating the video system.

In the event of contradictory measurement results, other criteria may also be employed for the decision as to which of the participating sensor systems is defective, e.g., including cases in which data from only two sensor systems are available for the object, or in which only two sensor systems are in fact present on the vehicle.

When the transverse offset of object 24 with respect to reference axis 18A is not zero, for example as in FIG. 3, azimuth angle j1 is approximately inversely proportional to the object distance. In this case the rate of change of azimuth angle j1 is therefore dependent on the relative velocity of the object, which is being directly measured using the radar system. If object 24 is in fact located on main axis 18A, however, and if the transverse offset is merely being simulated by a misalignment Dj of the sensor system, the measured (apparent) azimuth angle is then independent of the distance and the relative velocity. Correspondingly, even when a transverse offset of the object actually exists, there is a discrepancy between the measured rate of change in the azimuth angle and the rate of change predicted theoretically based on the relative velocity. From this discrepancy, a misalignment of the sensor system may be deduced.

With video system 16, the possibility additionally exists of measuring the distance-dependent change in the apparent size of object 24. This apparent change in size is directly proportional to the relative velocity, and approximately inversely proportional to the distance. An error in the distance measurement caused by misalignment of a camera may then be detected by the fact that the apparent change in size does not match the measured change in distance.

Since the nature of the object (e.g. a passenger car or a truck) may also be recognized using camera system 16, and since the typical actual size of such objects is at least approximately known, it is also possible to check whether the object distance measured with camera system 16 is compatible with the measured apparent size of the object.

If road markings are also detected using camera system 16, this information may also be utilized for automatic error recognition and error correction. The transverse offset of the vehicle itself relative to the center of the road may be detected based on the detected road markings. It is to be expected that as a statistical average, this transverse offset has a value of zero. If the evaluation in statistics module 46 shows that the measured transverse position of the vehicle itself continuously deviates in one direction away from the center of the lane, this indicates misalignment of one or both cameras. This is applicable only if the transverse offset of an object measured with the camera system deviates in the same direction from the transverse offset measured with another sensor system.

What is claimed is:

1. An object sensing device for a driver assistance system in a motor vehicle, comprising:
   at least two sensor systems which measure data concerning at least one of a location status and a motion status of an object in a vicinity of the motor vehicle, detection regions of the sensor systems overlap one another; and
   an error recognition arrangement configured to check the data for absence of contradictions and to output an error signal upon detection of a contradiction;
   wherein the error recognition arrangement checks, on a basis of the data, whether the object is located in an overlap region between a first detection region of a first sensor system and a second detection region of a second sensor system, and outputs the error signal one of when the object is not located by the second sensor system and when data measured by the second sensor system, taking into account error limits, deviate from data measured by the first sensor system;

and wherein for objects that are located in the overlap region, the error recognition device weights the data measured by the first sensor system and the second sensor system in accordance with reliability, and combines the weighted mutually corresponding data into data that are output to the driver assistance system.

2. The object sensing device of claim 1, wherein the sensor systems include at least one of a radar system, a lidar system, and a video system.

3. The object sensing device of claim 1, wherein the first sensor system is configured for a long-range region and the second sensor system is configured for a short-range region.

4. The object sensing device of claim 3, wherein the first sensor system includes one of a radar system and a lidar system.

5. The object sensing device of claim 3, wherein the second sensor system includes one of a radar system, a lidar system, and a video system.

6. The object sensing device of claim 1, wherein one of the sensor systems includes a video system including at least two cameras for acquiring a stereo image of the object.

7. The object sensing device of claim 1, wherein the error recognition arrangement is configured to identify, on a basis of a type of contradiction ascertained, which sensor system is causing the error.

8. The object sensing device of claim 7, further comprising:
    a correction arrangement configured to correct an ascertained error by one of realigning and recalibrating one of the sensor system that is causing the error and an evaluation unit belonging to that sensor system.

9. The object sensing device of claim 7, further comprising:
    a statistics module configured to record and store ascertained errors.

10. The object sensing device of claim 9, wherein the statistics module is configured to output an error message to a driver when an error ascertained by the error recognition arrangement occurs with a certain statistical frequency.

* * * * *